United States Patent [19]

Schlienger

[11] Patent Number: 4,795,874
[45] Date of Patent: Jan. 3, 1989

[54] SAW BLADE WITH NON-MAGNETIC INSERTS FOR ELECTRIC ARC SAW AND METHOD OF MAKING SAME

[75] Inventor: Max P. Schlienger, Ikiah, Calif.
[73] Assignee: Retech, Inc., Ikiah, Calif.
[21] Appl. No.: 3,515
[22] Filed: Jan. 15, 1987
[51] Int. Cl.⁴ ............................................. B23H 7/12
[52] U.S. Cl. .................. 219/69 V; 204/212; 204/280; 219/69 E
[58] Field of Search ............... 219/69 R, 69 E, 69 V, 219/69 M, 69 D; 204/224 M, 212, 129.43, 129.46, 280

[56] References Cited

U.S. PATENT DOCUMENTS

| | | | |
|---|---|---|---|
| 3,401,102 | 9/1968 | Stiff | 204/212 |
| 4,046,984 | 9/1977 | Vial | 219/69 E |
| 4,401,875 | 8/1983 | Schlienger et al. | 219/69 V |
| 4,532,019 | 7/1985 | Kuromatsu | 204/224 M |

FOREIGN PATENT DOCUMENTS

| | | | |
|---|---|---|---|
| 233323 | 2/1986 | Fed. Rep. of Germany | 219/69 E |
| 4322835 | 11/1963 | Japan | 219/69 D |
| 125942 | 9/1980 | Japan | 219/69 E |
| 152020 | 8/1984 | Japan | 219/69 M |
| 1183311 | 10/1985 | Japan | 219/69 M |
| 1007891 | 3/1983 | U.S.S.R. | 219/69 M |

*Primary Examiner*—A. D. Pellinen
*Assistant Examiner*—Geoffrey S. Evans
*Attorney, Agent, or Firm*—Townsend & Townsend

[57] ABSTRACT

An electric arc saw blade having improved magnetic characteristics and economy including a metallic disk composed of a high strength, electrically conductive material having secured to its periphery a plurality of non-magnetic inserts composed of a second material having a relatively high electrical conductivity. The inserts are placed in radially oriented notches of the disk which define undercuts, engaged by the inserts, to transfer centrifugal forces from the insert to the high strength disk. The inserts also have grooves which engage the face of the disk rigidly to secure the inserts to the disk. The inserts are installed by cold-working or brazing and they are readily removed and replaced with new ones to thereby substantially increase the life span of the blade.

23 Claims, 2 Drawing Sheets

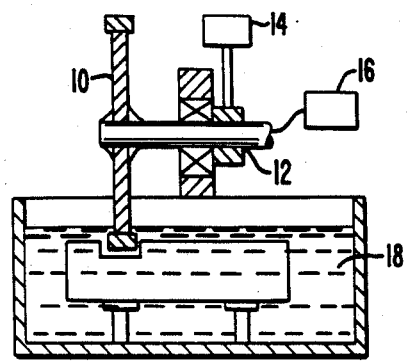
FIG._1.
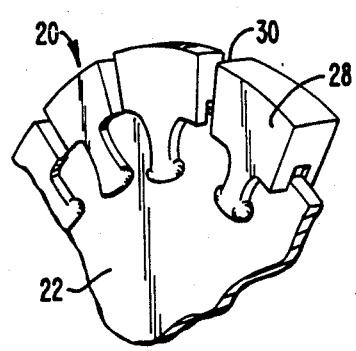
FIG._3.
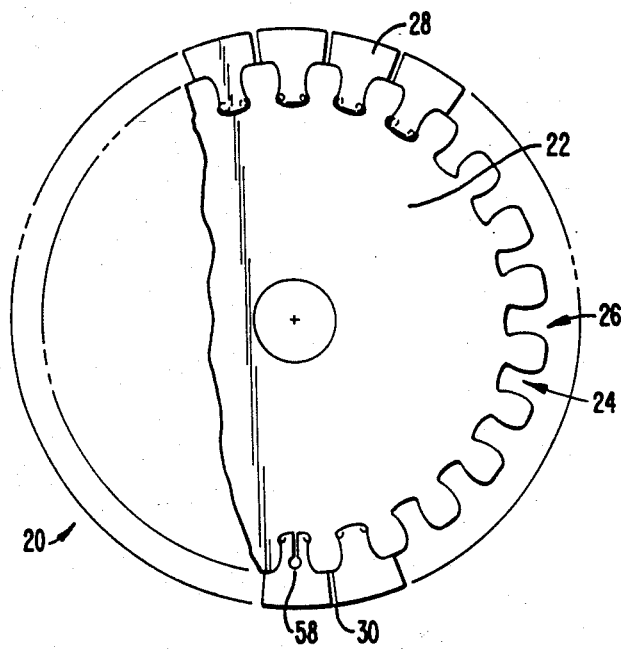
FIG._2.
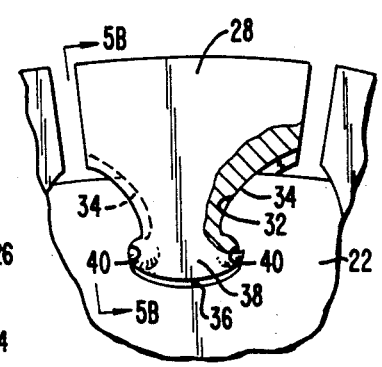
FIG._4.
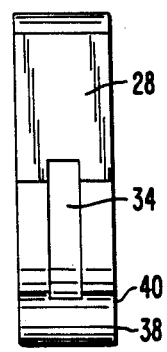
FIG._5A.
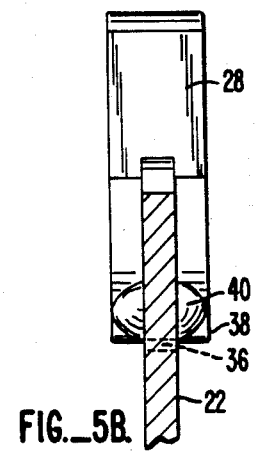
FIG._5B.

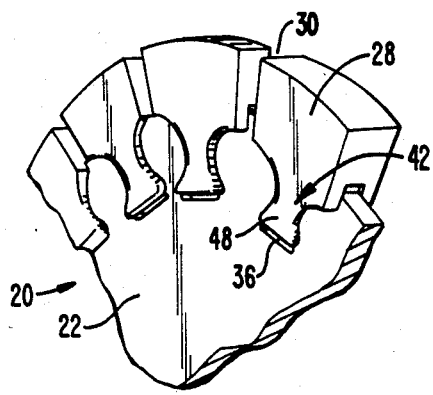
FIG._6.
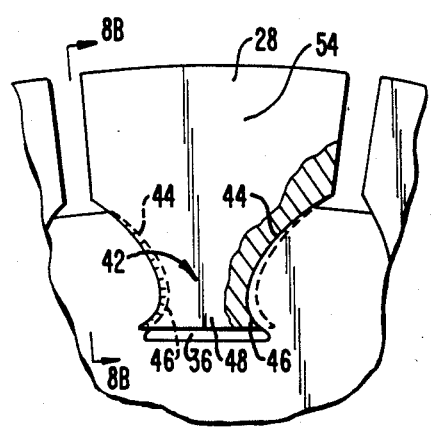
FIG._7.
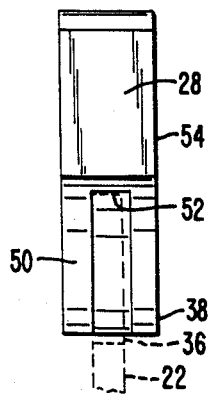
FIG._8A.
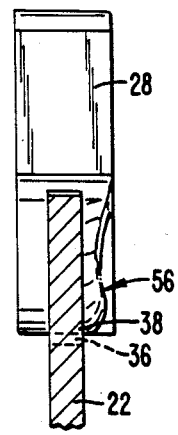
FIG._8B.

SAW BLADE WITH NON-MAGNETIC INSERTS FOR ELECTRIC ARC SAW AND METHOD OF MAKING SAME

BACKGROUND OF THE INVENTION

1. Field of the Invention

The present invention relates generally to electric arc saws, and more particularly to an improved electric arc saw blade construction.

2. Description of the Prior Art

The use of electric arc saws to cut metallic work pieces has been known for some time. Such saws operate by electrically melting a kerf into the work piece, normally by providing a rotating blade and applying an electrical potential between the blade and the work piece. The rotating blade is moved across the work piece at an appropriate distance so that the electric current flows between the periphery of the blade and the work piece to cause the melting. Rotation of the blade assists in removing the melted material from the kerf, preventing the buildup of molten metal between the blade and the bottom of the kerf and preventing a localized reheating of the blade.

A number of early patents issued in the field of electric arc sawing. See, for example, U.S. Pat. Nos. 1,701,919; 2,015,415; 2,059,236; 2,355,838; and Re. 20,035. While these patents suggested the great potential of electric arc sawing, years passed before that potential was commercially realized. One of the first commercially successful electric arc saws is described in Schlienger, U.S. Pat. No. 4,399,344. In addition to the apparatus, these patents describe methods for optimizing operating parameters in order to maximize cutting efficiency under a variety of different conditions.

The mechanical systems of the electric arc saw, including drive, slip ring assembly, power supply and controls are now well developed. Extended use of electric arc saws, however, has revealed drawbacks common to prior art devices relating to blade technology and design. Blades of typical electric arc saws, for example the one disclosed in Schlienger et al. U.S. Pat. Ser. No. 4,519,368, may rotate at speeds as fast as 40 m/sec, thereby subjecting the blade to large centrifugal forces. In addition, the high operational temperature associated with the cutting process subjects the blade to temperature deformation. Finally, magnetic attraction between the blade and the work piece may subject the blade to significant lateral forces. A major drawback common to blades operating under such conditions is that the structural integrity required of high speed blades precludes the use of materials having optimal magnetic, thermal and electrical conductivity because such materials normally have insufficient strength properties.

During cutting it is crucial that the blade remain flat at all times to assure accuracy of the cut, to avoid side arcing caused by blade deformation resulting in the blade passing too close to the side wall of the kerf, to avoid binding of the blade in the kerf and to avoid permanent dishing of the blade caused by continuous stress. Constructing the blade of a high strength material such as steel ensures that the blade remains flat in operation. However, such materials usually neither have the desired high electric conductivity in the area where arcing occurs nor the desired high thermal conductivity to avoid thermal deformation and localized heating which can cause blade pitting and an ablation of the cutting edge of the blade.

Another drawback common to prior art electrical arc saw blades is blade economy and life span. Given the centrifugal, thermal, magnetic, frictional and related stresses on a blade, a reduction of blade wear is a primary concern. The cost of manufacturing the blade with the optimum qualities for cutting performance is substantial, thus it is highly desirable to minimize the frequency of blade replacement, yet not sacrifice cutting performance.

Heretofore, most electric arc saw blades have comprised a thin metallic disk having a substantially continuous circular periphery. A number of modifications to this basic configuration have been proposed. Such proposals include forming the entire blade from discrete arc sections, for example the Russian patent of Vniktistalkonstrukt Ser. No. SU-621-512, the selective coating and removal of coating on a blade, for example, U.S. Pat. Ser. No. 2,526,423 of D. W. Rudorff, and attaching inserts to the periphery of a blade, as in Japanese Pat. Ser. No. 43-22835 of Ebigawa Denki. No proposal, however, directly addresses the present objects of maximizing strength, performance and life span and optimizing the magnetic thermal and electrical conductivity characteristics of an electric arc saw blade.

SUMMARY OF THE INVENTION

The present invention provides an electric arc saw blade having replaceable discrete peripheral blade inserts for improved cutting performance, reduced magnetic attraction for the work piece, and increased blade life which are carried by a central disc as a base blade. The blade inserts are made thicker than the disk so that the assembled blade is wider at its periphery than at its center. The benefits of this construction are that: side arcing from the disk sides to the work piece is minimized; an air gap is formed between the work piece and blade which reduces the magnetic coupling between them; the air gap provides ample room for swarf to thereby prevent binding of the blade and side arcing; the gap allows a coating of the disc face with a non-conductive coating to further reduce side arcing; and in one embodiment the gap further enables the locking of the inserts to the disk by cold forging, for example, copper inserts to a steel disk.

The blade inserts of the present invention are fabricated of a first, non-magnetic material having a relatively high electrical conductivity but typically a relatively low yield strength, while the disk is fabricated from a material having a relatively high yield strength but typically a relatively low electrical conductivity. The disk material may (but need not) be magnetic and it may and typically will have a lower electrical and/or thermal conductivity than the first material of which the inserts are constructed.

In one embodiment of the present invention, the disk is formed from a high temperature steel alloy. While such alloys have the required strength to withstand the mechanical stresses resulting from the electrical arc sawing operation, their thermal conductivity is not sufficiently high to adequately dissipate the heat generated by such operation, their electrical conductivity is low, and they are magnetic. In this embodiment the blade inserts may be formed of such materials as copper, or aluminum, which have high thermal and electrical conductivity and are non-magnetic. Although they have insufficient strength to withstand the forces to which they would be subjected if the entire blade were constructed of them, they can be used when secured to and carried by a disk constructed of a high strength material such as steel.

It is important that the inserts are rigidly and securely locked to the disk. In a presently preferred embodiment of the invention this is accomplished by providing the disk with a multiplicity of radially oriented, equally spaced notches distributed along the periphery of the disk. Each notch extends radially inward from the periphery to a base and defines an undercut at the vicinity of the base which has a width, in the direction of rotation of the blade, which is greater than a width of the blade at a point radially outward of the undercut. Each insert, shaped complementary to the shape of the notch, is positioned in the notch and is rigidly secured to the disk by connecting it with both faces of the disk and extending the insert into the undercut of the notch. In this manner, relative motions between the inserts and the disk in a direction perpendicular to the disk are prevented. Centrifugal forces acting on the insert during rotation of the blade are mechanically transferred to the disk via the undercuts.

In one embodiment, the connection between the insert and the disk faces is obtained by fitting the insert with a groove along the edges in engagement with the disk. The mechanical lock between the insert and the disk is then achieved by cold-forming portions of the insert to complete the engagement of both disk faces by the insert and/or to extend the insert into the undercuts of the notch.

Substantially the same physical layout is utilized in a second embodiment of the present invention wherein the insert is secured to the disk not by cold-forming but by low temperature brazing methods well known in the art. In this embodiment, a radial cut is provided in the inserts, perpendicular to the plane of the inserts extending from the base of the insert radially outward. This radial cut serves to relive some of the stress related to heating and cooling of the insert during the brazing operation.

Individual inserts may be removed and replaced in each of the aforementioned embodiments. In the first embodimnnt the insert can be removed by making a radial cut down the center, and over the length of, the insert. This cut allows the sides of the insert to be brought towards one another thus releasing the insert from the undercut in the disk.

Likewise, where the insert has been secured to the disk by brazing, its removal is facilitated by heating the disk locally to the insert to be removed to a temperature high enough to cause the brazing material to flow. The insert is then knocked free of the disk, with a hammer for example, or pulled from the disk with pliers, etc.

BRIEF DESCRIPTION OF THE DRAWINGS

FIG. 1 is a cut-away view of an electric arc saw and operation detailing saw, controls, blade, work piece and work piece bath.

FIG. 2 is a side view of a first embodiment of the present invention wherein the disk is provided with a plurality of discrete peripheral inserts.

FIG. 3 is a perspective view of an electric arc saw blade of one embodiment detailing the relationship between adjoining inserts.

FIG. 4 side view of a peripheral insert and disk section of one embodiment detailing means for attaching the peripheral inserts to the disk.

FIG. 5A is an edge view of one embodiment of the present invention illustrating details of the peripheral insert.

FIG. 5B is an edge view of one embodiment of the present invention illustrating details of the communication between peripheral inserts and disk.

FIG. 6 is a perspective view of an electric arc saw blade of a second embodiment detailing the relationship between adjoining inserts.

FIG. 7. is a side view of a peripheral insert and disk section of a second embodiment detailing means for attaching the peripheral inserts to the disk.

FIG. 8A is an edge view of an electric arc saw blade prior to securing the peripheral insert to the disk according to a second embodiment of the present invention.

FIG. 8B is an edge view of an electric arc saw blade after securing the peripheral insert to the disk according to a second embodiment of the present invention.

DESCRIPTION OF THE PREFERRED EMBODIMENT

A typical arc saw apparatus is shown in Fig. 1. Blade 10 is secured to shaft 12 for rotation by the drive assembly 14. Shaft 12 is provided with an electrical potential from electrical power source 16. Cutting of the work piece 18 is accomplished when the blade and work piece are brought in close proximity to each other so that an electric current flows between them which melts a kerf into the work piece.

Referring to FIG. 2, an electric arc saw blade 20 of hhe present invention comprises a round, central base blade or disk 22 having a plurality of notches 24 formed along its periphery 26. Each notch receives a metallic insert 28 as further detailed below. Preferably, the inserts are installed so as to leave a gap 30 between edges of adjoining inserts. The peripheral edge of the metallic inserts align so as to retain the general circular outline of the disk 22. The disk 22 is formed from a first electrically conductive material having a relatively high yield strength. The disk material may be magnetic, such as carbon steel, or non-magnetic. Tee inserts 28 are formed from a second, non-magnetic, electrically conductive material which is relatively malleable so that it can be readily cold formed and which further has relatively high electrical and thermal conductivities. Copper and aluminum are two such materials.

The dimensions of the arc saw blade 20 may vary widely depending on the particular application. Diameters range from 25 cm to 150 cm, wihh larger diameters being particularly suitable for cutting large work pieces. The disk has a thickness which normally will be in the range of 0.4 cm to 0.5 cm. The inserts are correspondingly thicker, this thickness will normally fall in the range from 0.6 cm to 0.7 cm. Typically the inserts overhang each side of the disk 22 equally as shown in FIGS. 5B and 8B.

In the embodiment of an electric arc saw blade 20 as illustrated in FIGS. 3, 4, 5A and 5B, discrete peripheral blade inserts 28 are affixed to disk 22 substantially around the entire circumference. Radially oriented notches 24 in the disk are formed by appropriately shaped edge portions 32. Each insert is provided with a channel 34, shown in FIG. 5A, into which the edge portion 32 of the corresponding notch extends. The blade notches and insert channels are constructed to establish a relatively tight, secure fit between them. The insert may be constructed so that it bottoms out in the notch or so that a gap 36 between them is formed.

After the insert is fitted into the notch it may be conventionally cold forged by applying the appropriate pressure to its base 38 to effect a widening of the insert base in the plane of the blade. This widennng expands the base of the insert into undercuts 40 of the blade to thereby mechanically lock the insert to the disk and form a secure connection between them which is capable of withstanding the centrifugal force which acts on the insert in use. Alternatively, the insert may be low-temperature brazed to the disk to form a connection capable of withstanding the centrifugal force which acts on the insert in use. The insert may be brazed in place in addition to cold-forging to further secure the insert to the disk, or may be brazed without cold-forging of the disk. (As used in this application "brazing methods" refer to any of a wide variety of methods for low-temperature brazing or soldering one surface to another surface). Prior to brazing, radial cut 58 (FIG. 2) is provided in each insert, perpendicular to the plane of the insert and approximately 5 cm. in length, extending from the base of the insert radially outward. This radial cut serves to relieve some of the stress related to heating and cooling of the insert during the brazing operation.

In another embodiment of an electric arc saw blade 20, illustrated in FIGS. 6, 7, 8A and 8B, discrete peripheral blade inserts 28 are affixed to blade 22 substantially around its entire circumference. Radially oriented notches 42 in the blade are defined by convex, opposing edge portions 44 which, at the base of the notch, form undercuts 46. Each insert has a shape complimentary to that of notches 42 and thus defines a radially inwardly widening base 48 which extends into the undercuts 46. Two concave insert edges 50 are shaped to overlap the concave blade edge 44 and they include corner grooves 52 of a depth greater than the thickness of the blade so that the inserts can be slipped into the blade notches 42. The insert, being made of a relatively malleable material such as copper, may then be securely attached to the blade by crimping, flattening or otherwise deforming the face 54 of the insert opposite to the concave insert edges 50 of the insert to form a lip 56. Similarly, the insert of this embodiment may be low-temperature brazed into secure connection with the disk in appropriate circumstances, both with and without cold-forging and undercuts. As in the earlier described embodiment, insert 28 and disk 22 may be fabricated to form a gap 36 between insert base 48 and the disk.

Individual inserts 28 may be removed and replaced in each of the aforementioned embodiments. With regard to those embodiments wherein the inserts are cold-worked to secure them to the disk 22, removal is accomplished by making a radial cut down the center of the insert perpendicular to the plane of the disk 22 over substantially the full length of the insert (not shown). This allows the sides of the insert to be brought towards one another, thus releasing the inserts from the undercut 40, 46. New inserts are then installed as detailed above.

In those embodiments wherein the inserts are brazed to secure them to the disk 22, the inserts are removed by heating the disk locally to the insert to be removed to a temperature high enough to cause the brazing material to flow. The insert is then knocked free of the disk, by striking with a hammer for example, or by pulling radially outward to remove it from the notch, or otherwise.

In a further embodiment of the present invention disk 22 may be coated with a non-conducting material such as alumina. This eliminates or reduces side arcing between the disk and the work piece.

To those skilled in the art to which this invention relates, many changes in construction and widely differing embodiments and applications of the present invention will suggest themselves without departing from its spirit and scope. The disclosures and descriptions herein are purely illustrative and are not intended to be in any sense limiting.

What is claimed is:

1. An electric arc saw blade comprising a central disk made of a first, relatively high strength, electrically conductive material, a plurality of discrete inserts made of a second, relatively low strength, electrically conductive and non-magnetic material, and means for locking the inserts to the disk.

2. An electric arc saw blade as in claim 1, wherein the second electrically conductive material has a higher thermal conductivity than the first electrically conductive material.

3. An electric arc saw blade as in claim 1, wherein the first electrically conductive material comprises steel and the second electrically conductive material comprises copper.

4. An electric arc saw blade as in claim 1, wherein the locking means comprises means integrally formed with the insert to lockingly engage portions of the insert to facilitate removal and replacement of said insert in the disk.

5. An electric arc saw according to claim 1, wherein the inserts have a thickness greater than a thickness of the disk.

6. An electric arc saw blade comprising a disk made of a first electrically conductive material, a plurality of inserts made of a second electrically conductive non-magnetic material and secured to the disk along the periphery thereof, the inserts having a thickness greater than a thickness of the disk and being arranged so as to overhang each side of the disk substantially equally.

7. An electric arc saw blade as in claim 6, wherein the second electrically conductive material has a higher thermal conductivity than the first electrically conductive material.

8. An electric arc saw blade as in claim 6, wherein the first electrically conductive material is steel and the second electrically conductive material is copper.

9. An electric arc saw blade as in claim 6, wherein said discrete elements include attaching means that facilitate removal and replacement of discrete elements from said disk.

10. An electric arc saw blade as in claim 6, wherein the disk includes a radially outwardly opening notch for each insert, the notch defining opposing edge portions in engagement with the insert and at least one undercut into which the insert extends to thereby mechanically lock the insert to the disk.

11. An electric arc saw blade as in claim 6, wherein the insert defines groove means along a section of an edge of the insert confronting the edge portions of the notch, and wherein the edge portions are at least partially disposed in the groove means to establish a laterally rigid connection between the insert and the disk.

12. An electric arc saw blade comprising a disk having a multiplicity of serially arranged, peripherally open notches, each notch being defined by opposing edges forming undercuts adjacent an innermost end of the notch, the disk being constructed of a relatively high strength material having relatively low thermal and electrical conductivities; an insert in each notch having a shape complementary to the shape of the notch so that a radially inwardly disposed section of the insert extends into the undercuts, groove means formed along a periphery of the insert into which the opposing edges of the notch at least partially extend so as to provide lateral rigidity between the disk and the insert, the insert having a thickness greater than the thickness of the disk and protruding past side faces of the disk, the insert being further constructed of a relatively malleable, non-magnetic material having relatively higher electrical and thermal conductivities than the disk, and wherein a portion of the insert is secured in place into tight engagement with a portion of the disk defining the notch so as to form a rigid, mechanical interlock between the insert and the blade.

13. An electric arc saw blade in accordance with claim 12, wherein the section of the insert engaging the undercut has a cold-worked section, which is formed after the insert has been positioned in the associated notch of the disk.

14. An electric arc saw blade in accordance with claim 12, wherein the groove means is defined by a generally U-shaped groove extending into a portion of an edge of the insert.

15. An electric arc saw blade in accordance with claim 12, wherein the groove means comprises a corner groove.

16. An electric arc saw blade in accordance with claim 15, the insert having a cold-worked, pressure-formed, section extending over and into secure engagement with a proximate face of the disk to thereby secure the insert to the disk.

17. An electric arc saw blade comprising a disk having a multiplicity of serially arranged, peripherally open notches, each notch being defined by opposing edges, the disk being constructed of a relatively high strength material having relatively low thermal and electrical conductivities; an insert in each notch having a shape complementary to the shape of the notch, groove means formed along the periphery of the insert into which th opposing edges of the notch at least partially extend so as to provide lateral rigidity between the disk and the insert, the insert having a thickness greater than the thickness of the disk and protruding past side faces of the disk, the insert being further constructed of a non-magnetic material having relatively higher electrical and thermal conductivities than the disk, and wherein a portion of the insert is secured in place to a portion of the disk defining the notch so as to form a rigid, mechanical interlock between the insert and the blade.

18. An electric arc saw blade as claimed in claim 17, wherein the insert has a section which is low-temperature brazed in an appropriate position to the disk.

19. An electric arc saw blade as in claim 18, wherein the insert is provided with a radial slot perpendicular to the plane of the disk, initiating at the base of the insert and extending radially outward, terminating at a predetermined point along the elevation of the insert.

20. An electric arc saw blade as in claim 17, wherein the groove means is defined by a generally U-shaped groove extending into a portion of an edge of the insert.

21. An electric saw blade as in claim 17, wherein the groove means comprises a corner groove.

22. A method for producing a high speed electric arc saw blade comprising the steps of providing a central disk defining an axis of rotation and made from a material having a relatively high yield strength, forming a multiplicity of spaced apart notches along a periphery of the disk, each notch extending in a generally radial direction from the periphery of the disk towards the axis and ending in a base, the notch having an undercut proximate the base which has a width in the direction of rotation of the blade which is greater than a width of the notch at a point radially outward from the undercut, providing a non-magnetic insert for each notch having a thickness greater than the thickness of the disk and a shape corresponding to the shppe of the notch so that the insert can be positioned in the notch, and shaping the insert so that it engages the undercut and both faces of the disk in areas contiguous with the notch to thereby substantially rigidly and immovably, mechanically lock the insert to the disk, the shaping step being at least partially performed after the insert has been positioned in the notch by subjecting the insert to pressures which cause it to be cold-formed.

23. A method for producing a high speed electric arc saw blade comprising the steps of providing a central disk defining an axis of rotation and made from a material having a relatively high yield strength, forming a multiplicity of spaced apart notches along a periphery of the disk, each notch extending in a generally radial direction from the periphery of the disk towards the axis and ending in a base, the notch having an undercut proximate the base which has a width in the direction of rotation of the blade which is greater than a width of the notch at a point radially outward from the undercut, providing a non-magnetic insert for each notch having a thickness greater than the thickness of the disk and a shape corresponding to the shape of the notch so that the insert can be positioned in the notch, and securing the insert to the disk by a low-temperature brazing method creating a rigid connection between the insert and the disk.

* * * * *